United States Patent [19]
Sherman

[11] Patent Number: 5,165,145
[45] Date of Patent: Nov. 24, 1992

[54] HINGE FOR USE WITH PORTABLE ELECTRONIC APPARATUS

[75] Inventor: Howard F. Sherman, McGraw, N.Y.

[73] Assignee: Smith Corona Corporation

[21] Appl. No.: 589,141

[22] Filed: Sep. 27, 1990

[51] Int. Cl.$^5$ .................. E05C 17/64; E05D 11/08
[52] U.S. Cl. .................................. 16/341; 16/342
[58] Field of Search ............... 16/337, 341, 342, 340

[56] References Cited

U.S. PATENT DOCUMENTS

| | | | |
|---|---|---|---|
| 1,644,249 | 10/1927 | Harrison | 16/340 |
| 3,052,497 | 9/1962 | Lohr | 16/341 |
| 4,571,456 | 2/1986 | Paulson et al. | 179/2 C |
| 4,624,454 | 11/1986 | Lake, Jr. et al. | 248/454 |
| 4,781,422 | 11/1988 | Kimble | 312/72 |
| 4,808,017 | 2/1989 | Sherman et al. | 400/83 |
| 4,859,092 | 8/1989 | Makita | 400/83 |

FOREIGN PATENT DOCUMENTS 472975  5/1951  Canada .................... 16/340

OTHER PUBLICATIONS

Design News Magazine, dated Feb. 12, 1990, pp. 262 & 263, article "Constant-Torque Slip Clutch Supports Computer Screen" by Charles J. Murray.

*Primary Examiner*—Robert L. Spruill
*Assistant Examiner*—Carmine Cuda

[57] ABSTRACT

A hinge mechanism is disclosed which is suitable for use on a pivotable character display for an electronic typewriter or portable computer. The hinge mechanism includes braking means for maintaining the character display in a viewing position, wherein friction is generated between disc shaped brake members of the hinge mechanism. Moreover, the addition of a cam in the hinge mechanism provides the selective use of torque to the braking means; the cam is engaged when the display is in a viewing position, preventing the display from slipping out of position, whereas the cam is not engaged when the display is near the horizontal, making it easier to raise and to lower the display. The hinge mechanism disclosed is suitable for use with multi-view position character displays as well as with single view position character displays.

19 Claims, 6 Drawing Sheets

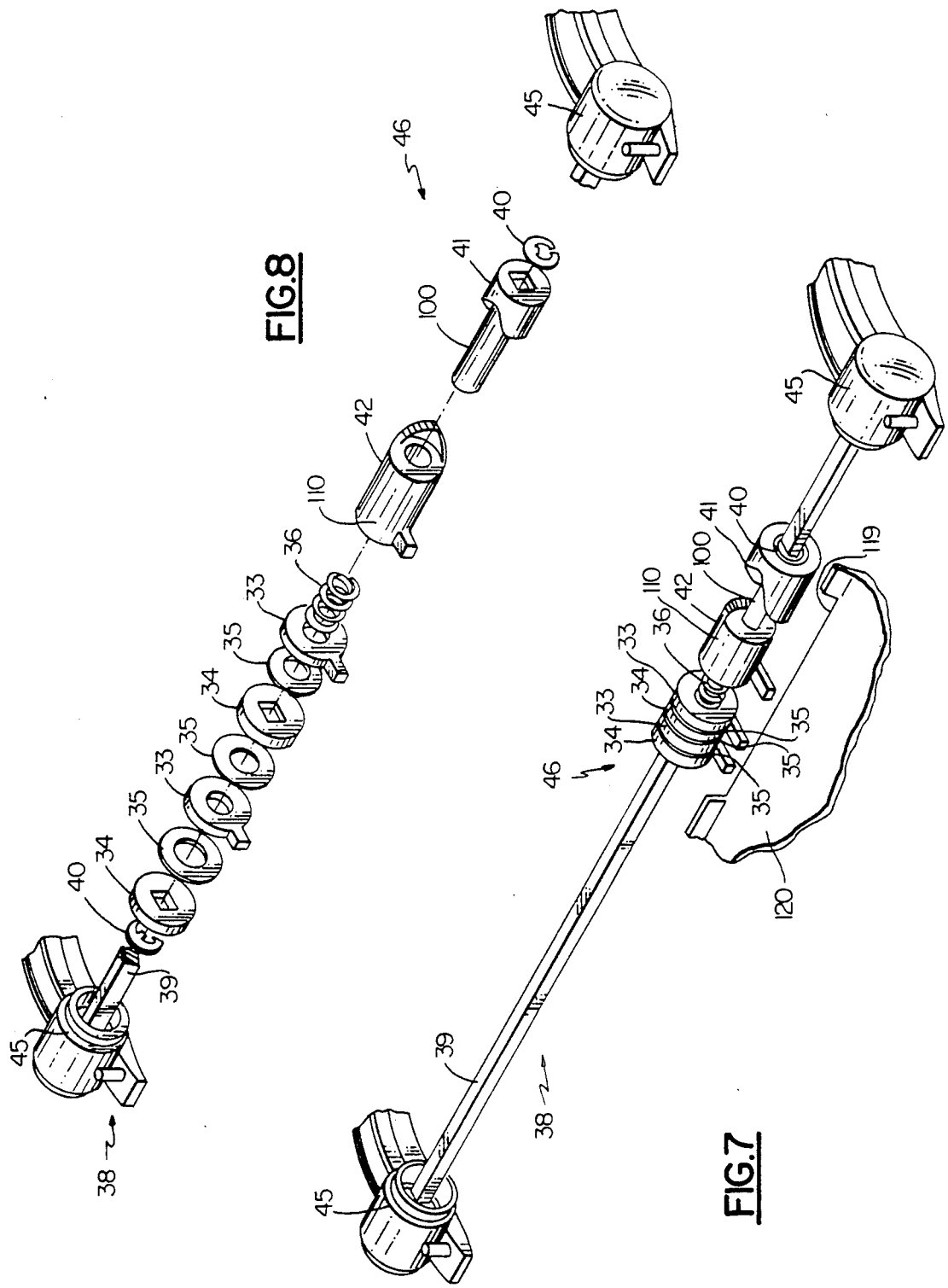

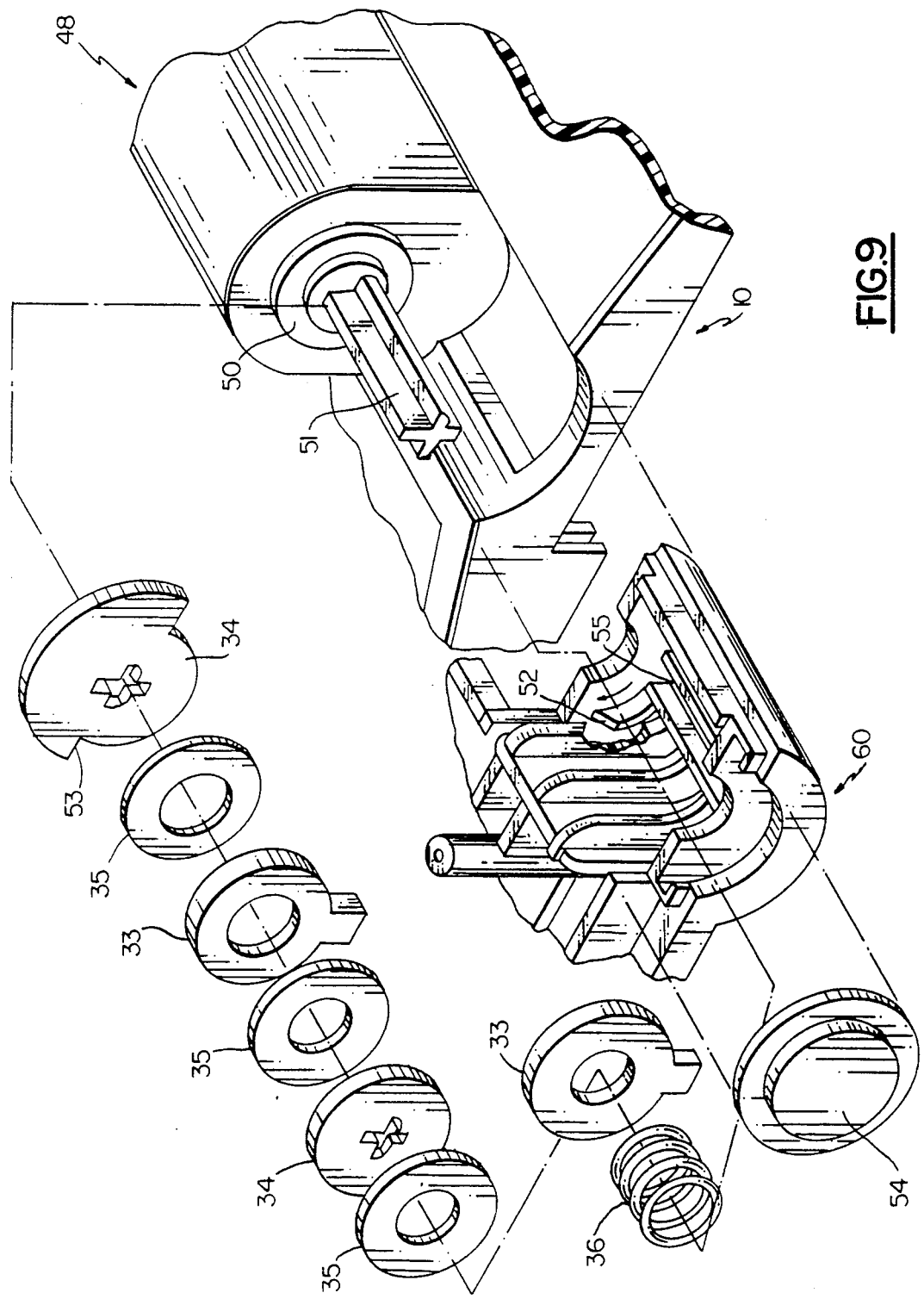

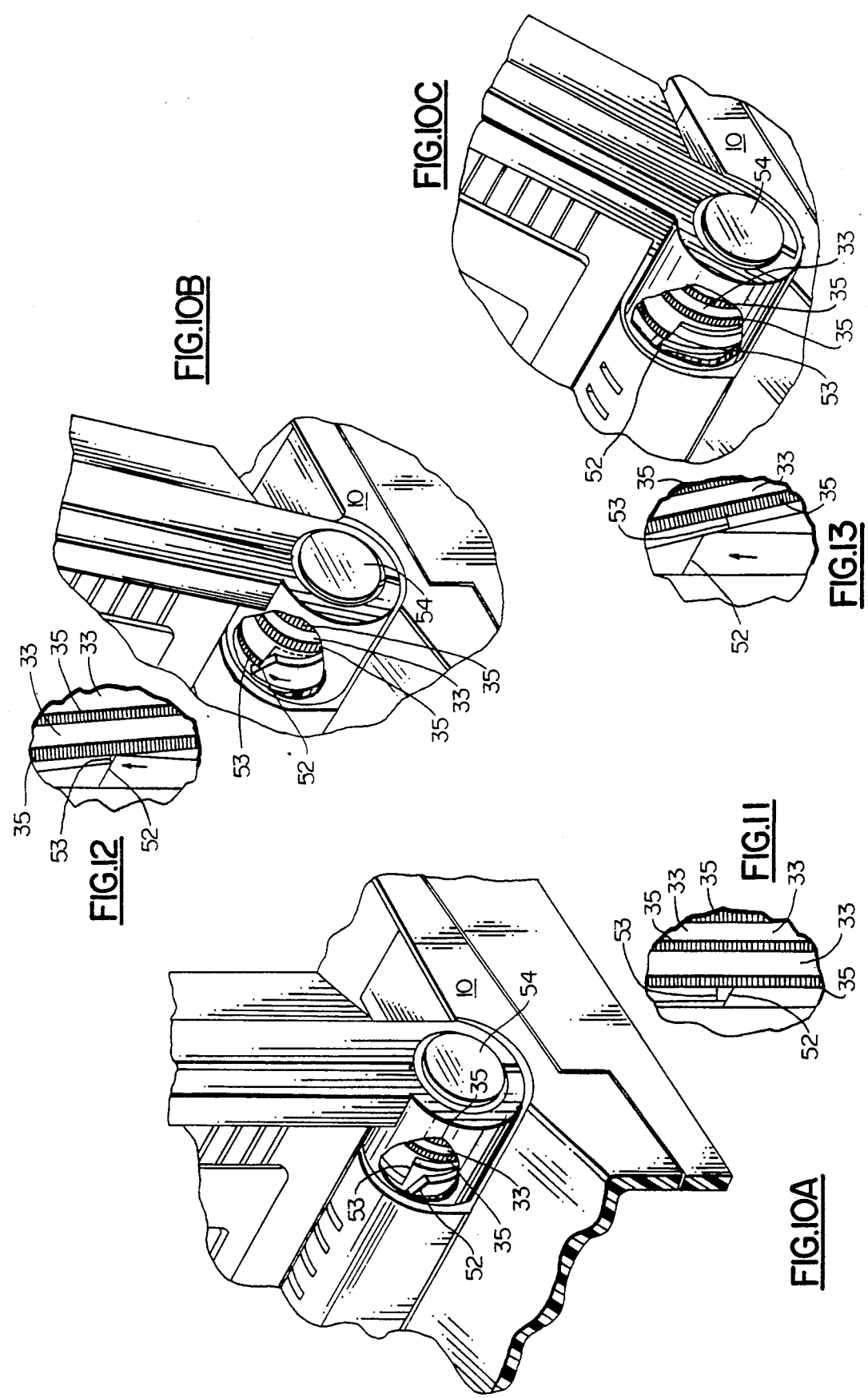

HINGE FOR USE WITH PORTABLE ELECTRONIC APPARATUS

CROSS-REFERENCE TO RELATED APPLICATIONS

Reference is made to a co-pending application Ser. No. 589,140 entitled "Brake Mechanism For A Pivotable Character Display" by Howard F. Sherman, filed concurrently with the present application and assigned to the same assignee as the present application.

BACKGROUND OF THE INVENTION

1. Field of the Invention

This invention relates to hinges, especially hinges suitable for use on a support structure for a pivotable character display having a relatively flat liquid crystal display (LCD) panel for an electronic typewriter or portable computer. More particularly, this invention relates to an improved means for pivoting the character display to provide open positions for viewing the character display.

2. Description of the Related Art

A character display pivotably mounted on a typewriter is disclosed in U.S. Pat. No. 4,808,017 issued on Feb. 28, 1989 to Howard F. Sherman et al.. That invention was concerned with mounting a display panel on an electronic typewriter such that its presence when open did not hinder the printing functions of the typewriter. That patent also discloses a hinge mechanism which includes "a spring operable to dampen the pivotable movement near the closed position" whereby dampening of the pivotable movement of the hinge was accomplished by addition of torsional tension to the spring. The purpose of this dampening means is to prevent the "character display from being harshly closed which avoids damaging the character display and/or the typewriter."

Along similar lines, U.S. Pat. No. 4,571,456 issued on Feb. 18, 1986 to David C. Paulsen et al. for a "Portable Computer" includes hinge assemblies which are associated with torsion springs for the purpose of "preventing the inadvertent slamming of the display housing against the base during closing."

A tilt control apparatus is disclosed in U.S. Pat. No. 4,624,434 issued on Nov. 25, 1986 to Ralph J. Lake, Jr. for a "Stable Tiltable Display Terminal." The Lake apparatus includes a tilt control having a torsional spring and friction producing means.

The friction producing means disclosed in the Lake patent is a pair of hollow open-ended tubes which fit into each other and which rotate against each other to produce friction substantially along the pivot axis. The mechanical fit between the tubes can be adjusted by tightening a screw to narrow the diameter of the outer tube, thus allowing for a greater or lesser amount of friction to be produced.

SUMMARY OF THE INVENTION

A hinge mechanism with braking capability is mounted on a support structure for a pivotable character display for an electronic typewriter or portable computer for movement between open positions for viewing and a closed position for covering the keyboard.

A pivot axis for the character display is located rearward from the keyboard. If there is a built-in printer function on the electronic typewriter or portable computer, this pivot axis should be located substantially in alignment with a rotatable axis of the platen.

The character display may also have a second pivot axis. A second pivot axis is defined by two aligned hinge mechanisms located on opposite sides of the cover member, just down from the LCD panel. The presence of the second pivot axis provides the operator with the option of either opening the display along the first pivot axis to a first viewing position when utilizing built-in printer functions in conjunction with the character display, or opening the display along the second pivot axis to a second viewing position when only utilizing the character display and not the printer.

One of the hinge mechanisms utilizes friction to provide braking means when the character display is raised to an open or viewing position from the closed position. The hinge mechanism is designed such that friction is induced between pieces in a direction perpendicular to the pivot axis. The friction between the various pieces of the hinge mechanism holds the character display in the open or viewing position chosen by the operator, such that there are an infinite number of viewing positions between the vertical and a short distance back from the vertical. Furthermore, as the pieces are securely fitted against each other by a spring, the amount of friction produced between the pieces can be controlled by the size and coil of the spring.

The addition of a cam in the hinge mechanism provides the selective use of torque to the braking means. When the display is raised from the closed position, the cam is not engaged until the display nears the vertical. Thus, the cam is engaged when the display is in a viewing position, preventing the display from slipping out of position, whereas the cam is not engaged when the display is near the horizontal, making it easier to raise and to lower the display.

Further objects, features and advantages may be found in the following drawing, specification and claims.

BRIEF DESCRIPTION OF THE DRAWINGS

FIG. 7 illustrates a second embodiment of the invention and is a perspective view of the hinge mechanism located along a pivot axis.

FIG. 8 is an exploded perspective view of the second embodiment of the invention as shown in FIG. 7.

FIG. 9 illustrates a third embodiment of the invention and is an exploded perspective view of a right side hinge mechanism of a pivot axis, showing the means for pivotable movement along the pivot axis.

FIGS. 10A-10C show an exaggerated illustration of the operation of the third embodiment of the invention as the character display is moved to the viewing position, especially with regard to the interaction between a cam and a cam follower.

FIG. 11 is an enlarged section of FIG. 10A showing the cam slightly spaced away from the cam follower.

FIG. 12 is an enlarged section of FIG. 10B showing the cam contacting the cam follower.

FIG. 13 is an enlarged section FIG. 10C showing the cam pressing on the cam follower for driving the cam follower in an axial direction.

DETAILED DESCRIPTION OF THE INVENTION

For the purposes of the following discussion, the following definitions are to be applied. Polygonal or irregular, in reference to cross section, shall mean any polygonal shape except a circular shape. An "open" or "viewing" position shall not refer merely to a single position, but shall refer to an infinite number of possible positions within a limited area. Specifically, when the character display is in an open or viewing position, it is located in a vertical or near-vertical position relative to the base of the apparatus. The term "non-moving abutment" or "stationary" shall not necessarily refer to an absolutely non-moving abutment, but rather shall refer to an abutment which is non-moving relative to another piece of the mechanism (such as end piece).

Figure 1:
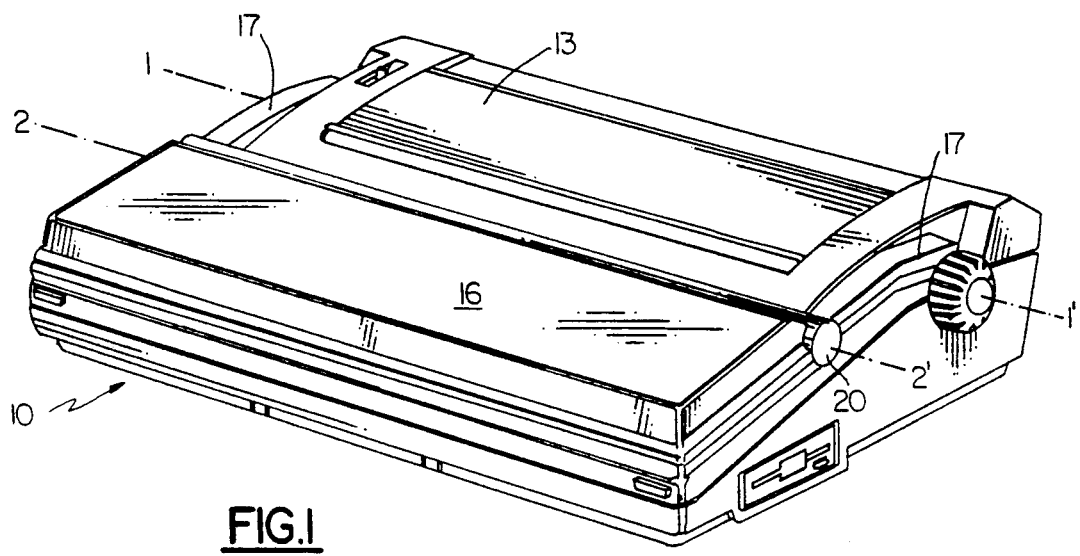
FIG. 1 is a perspective view of a two-view position electronic typewriter made in accordance with the present invention, showing the character display in a closed position.
Figure 2:
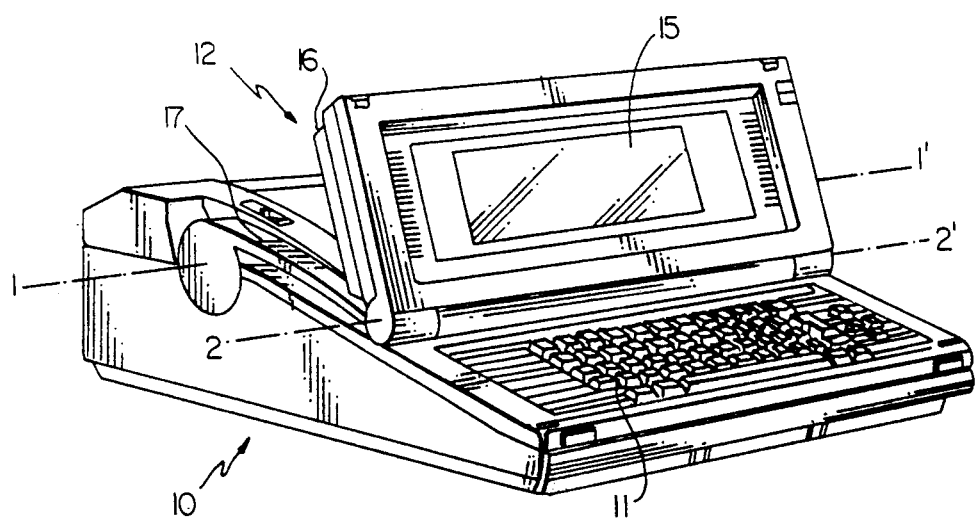
FIG. 2 is a view similar to FIG. 1, but taken from the left side, showing the character display in the second open position along the second pivot axis.
Figure 3:
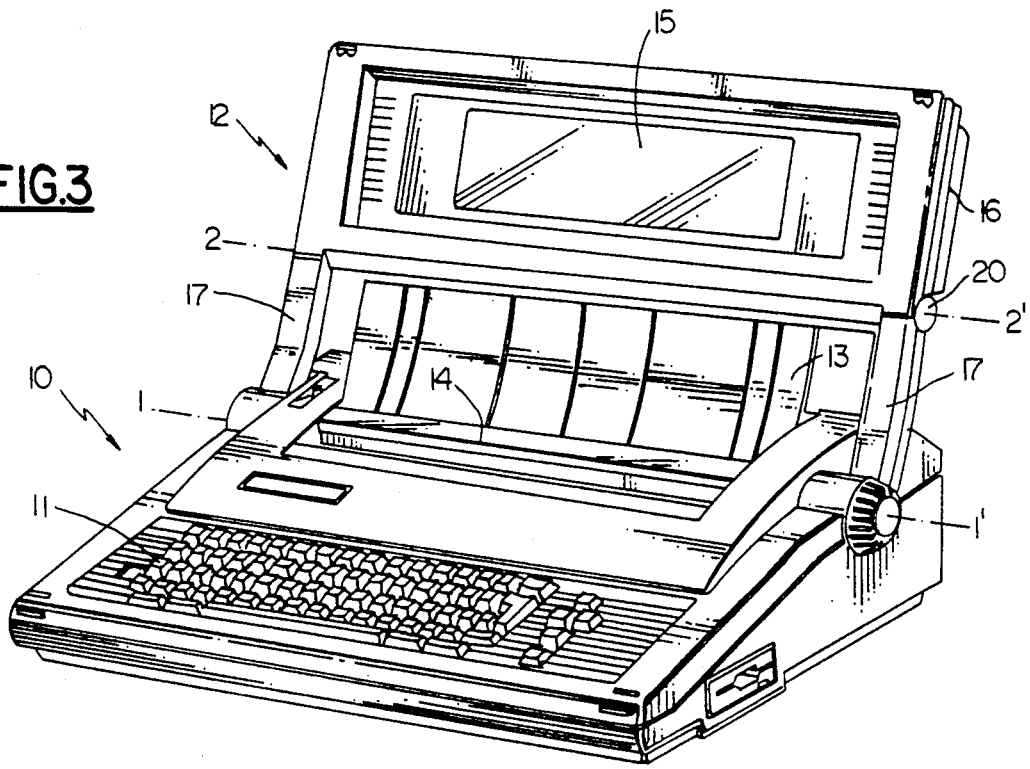
FIG. 3 is a view similar to FIG. 1, showing the character display in the first open position along the first pivot axis.

Referring to FIGS. 1-3, an electronic apparatus 10 is shown which has a keyboard 11, a character display 12 and a platen 14 for supporting a work sheet for printing purposes having a rotatable axis 1—1'.

A support structure 17 is pivotally mounted on the electronic apparatus 10 and supports the character display 12 for pivotable movement about axis 1—1, between a first open position (FIG. 3) and a closed position (FIG. 1). A second pivot axis 2—2' may be located between the character display 12 and the support structure 17 for pivotable movement of the character display 12 between the closed position (FIG. 1) and a second open position (FIG. 2). If the operator does not require the printer function, the character display 12 can be pivoted about the second pivot axis 2—2' and opened to the second viewing position.

With the character display 12 pivotable about the platen axis 1—1' and opened to the first viewing position, a work sheet may be conveniently inserted and removed. This arrangement also provides the capability of having a paper support 13 pivotable between an open position (FIG. 3) and a closed position (FIG. 1) when the character display 12 is either in an open or closed position. This arrangement further provides the capability of having a gap between the character display 12 and the paper support 13 for the leading end of the work sheet to pass therethrough and go behind the character display 12 as the trailing end of the work sheet approaches a line-of-write of the typewriter.

Figure 4:
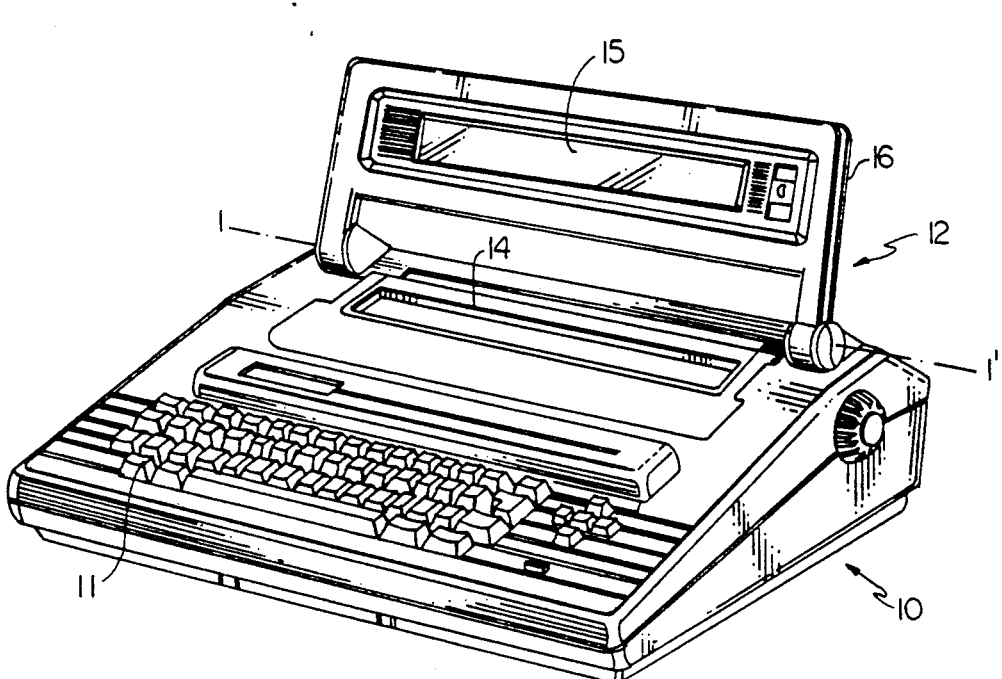
FIG. 4 is a perspective view of a single view position electronic typewriter made in accordance with the present invention, showing the character display in an open position.
Figure 5:
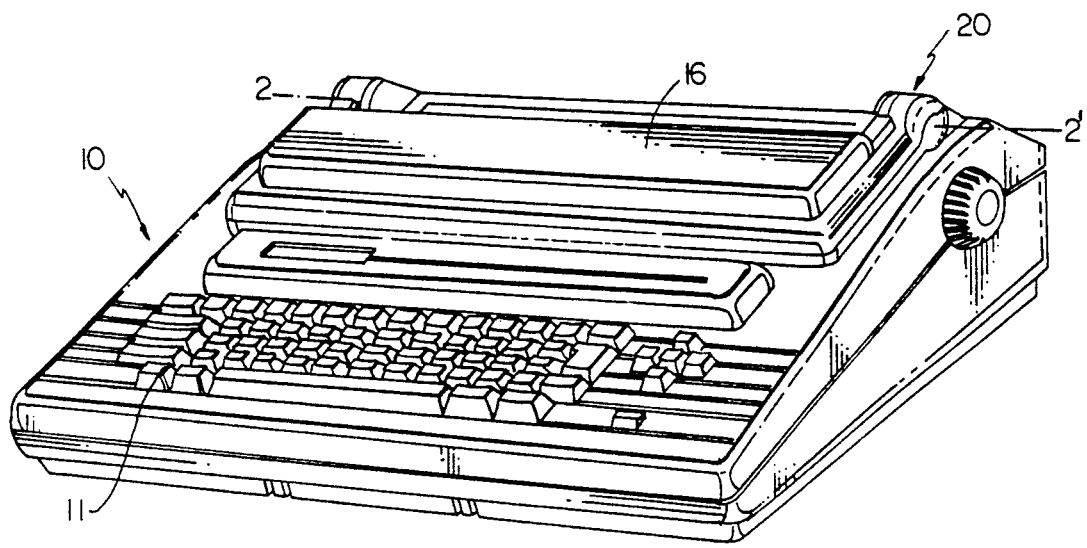
FIG. 5 is a view similar to FIG. 4, showing the character display in the closed position.

FIGS. 4 and 5 illustrate the hinge mechanisms as used on a single view position electronic apparatus. Although the electronic apparatus of FIG. 4 and 5 has a built-in printer, it is to be understood that the hinge mechanisms may be used on any number of other pivotable character displays, either single or multi-view, with or without a built-in printer.

First Embodiment

Figure 6:
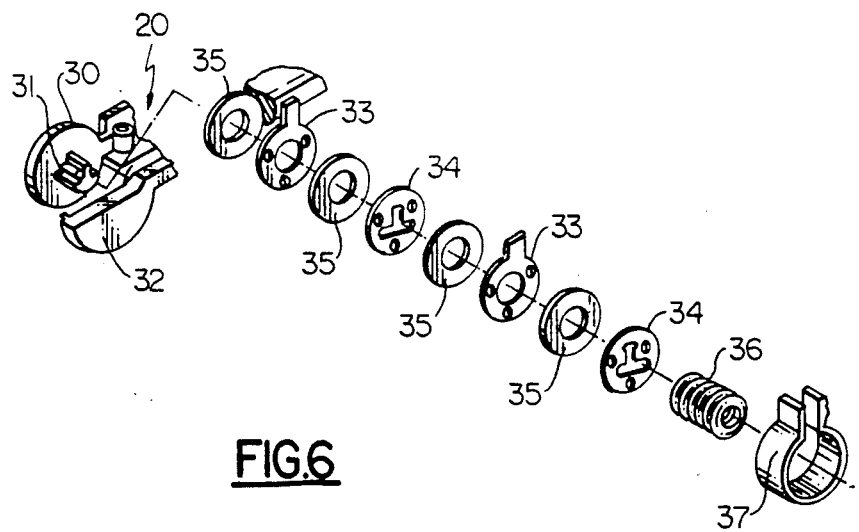
FIG. 6 illustrates a first embodiment of the invention and is an exploded perspective view of a left side hinge mechanism of a pivot axis, showing the means for pivotable movement along the pivot axis.

FIG. 6 illustrates an example of a means for pivotable movement around a pivot axis, such as illustrated in FIG. 1-5, wherein the means for pivotable movement includes a hinge mechanism 18 located at one end of the pivot axis, within a hinge portion 20. The hinge mechanism 18 comprises a non-moving abutment 30 having a short shaft 31 with an open end extending therefrom, an end piece 32 located opposite and parallel to the non-moving abutment 30, a pair of friction plates 33, a pair of friction discs 34, a plurality of friction 35, and a spring 36. The non-moving abutment 30 is fabricated integrally with the character display 12 and will therefore mo as the character display 12 is moved.

The short shaft 31 is in alignment with the pivot axis and has a polygonal or irregular cross section. Each of the friction plates 33, friction pads 35 and friction discs 34 are essentially flat discs, the friction plates 33 additionally having a key section extending outwardly from the center. Each of the friction plates 33 and friction pads 35 have a central, circular opening and each of the friction discs 34 has a central opening, the shape of which conforms to the cross sectional shape of the short shaft 31, such that the pieces may be inserted onto the short shaft 31. The friction plates 33 and friction discs 34 are plastic or some other frictionless material, while the friction pads 35 are made of rubber or some other friction-inducing material.

The friction plates 33, friction pads 35 and friction discs 34 are inserted into the open space between the open end of the short shaft 31 and the end piece 32, then onto the short shaft 31. The friction plates 33 and friction discs 34 are alternately located along the short shaft 31 and the friction pads 35 are located at every other position along the short shaft 31, such that every other piece along the short shaft is a friction pad 35 and the friction plates 33 and friction discs 34 are located alternately in the remaining positions. The spring 36 is then fitted into the open space between the open end of the short shaft 31 and the end piece 32 of the hinge portion 20. When the spring 36 is in place, the spring 36 compresses the friction plates 33, friction discs 34 and friction pads 35 against each other.

A slip ring 37 also fits into the hinge portion 20 between the non-moving abutment 31 and the end piece 32. The slip ring 37 is a circular band having two ends which come together but do not quite meet. The open section of the slip ring 37 is slightly larger than the key section of one of the friction plates 33. When the hinge mechanism 18 is put together, the key sections of each of the friction plates 33 extend into the open section of the slip ring 37. This effectively restricts the field of motion of the friction plates 33, while allowing the friction discs 34 to rotate with the pivot axis 2—2, as the character display 12 is moved. The resultant friction between the non-moving or stationary friction plates 33, the turning friction discs 34 and the freely rotating friction pads 35 prevents the character display 12 from crashing down onto the keyboard 11, as well as maintaining the character. display 12 in a position for viewing.

The end piece of the hinge portion could also be made to incorporate the function of the slip ring. If this is done, the end piece must necessarily be two pieces, one piece of which is fabricated integrally with the character display and one piece of which is fabricated integrally with the support for the character display.

This will allow the piece of the hinge mechanism to inserted into the opening within the hinge portion.

Second Embodiment

FIGS. 7 and 8 illustrate another example of a means for pivotable movement around a pivot axis, wherein the means for pivotable movement is a hinge mechanism 38 forming the pivot axis. The hinge mechanism 38 comprises a pair of end pieces 45, a shaft 39 extending between the end pieces 45, a pair of C-rings 40 capable of being firmly attached to the shaft 45, a pair of friction plates 33, a pair of friction discs 34, a plurality of friction pads 35, a cam 41, a cam follower 42 and a spring 36.

The cam follower 42 has a circular central opening which fits over an end portion 100 of the cam 41 and the cam 41 has a central opening, the shape of which conforms to the cross sectional shape of the shaft 39. An end portion 100 of the cam 41 is cylindrically shaped to receive the cam follower 42. The end of the cam follower 42 which is distal to the cam 41 has a key section 110 extending outwardly from the central opening, similar in shape and function to that of a friction plate 33.

The shaft 39 is in alignment with the pivot axis and has a polygonal or irregular cross section. Each of the end pieces 45 is connected to one end of the shaft 39. Each of the C-rings 40 are located on the shaft 39 between the end pieces 45. The friction plates 33, friction discs 34, friction pads 35, Cam 41, cam follower 42 and spring 36 are compactly strung onto the shaft 39 between the C-rings 40 to form a braking means 46 for the hinge mechanism 38.

The friction plates 33, friction discs 34, friction pads 35 and the spring 36 are located on the shaft 39 in the same configuration as that found in the first embodiment (FIG. 6). The cam 41 and cam follower 42 are located at one end of the hinge mechanism 38 between the spring 36 and one of the C-rings 40. When the braking means 46 is put together, the key sections of each of the friction plates 33, as well as the key section 110 of the cam follower 42, extend into an open section 119 of a cover 120 for the shaft 39, which is fabricated integrally with the character display 12. This cover 120 is similar to the slip ring 37 found in the first embodiment and performs the same function.

Thus, the friction plates 33 and the cam follower 42 do not rotate independent to the movement of the character display 12 since the key sections are held in place by the cover 120 which is attached to the character display 12. Further, as the shaft 39 is firmly attached to the end portions 45, which are not attached to the character display 12, the shaft 39 remains stationary when the character display is moved from a closed to an open position, or vice versa. Since the shaft 39 remains stationary, the friction discs 34, which each have a central opening to conform to the cross-sectional shape of the shaft 39, also remain stationary. The friction pads to rotate freely, as in the first embodiment. This combination of freely rotating friction pads 35, stationary friction discs 34 and rotating friction plates 33 produces friction in the same manner as described in the first embodiment.

Unlike the first embodiment, this second embodiment provides the braking means 46 with additional friction in the form of torsional force in response to pivotal movement of the character display 12. The additional friction is the result of the cam follower 42 rotating relative to the cam 41 which increases the compression that the spring 36 puts against the friction plates 33, friction discs 34 and friction pads 35.

Also, unlike the first embodiment, this second embodiment does not necessarily need to be on an end portion of the pivot axis, but may be located at any point along the pivot axis. This is due to the use of the pair of C-rings 40, which together define the braking means 46 and essentially function as non-moving abutments.

If this hinge mechanism 38 is to be used on the second pivot axis of a two view pivotable character display 12, the cam 41 may have a second rise so that the angle of the character display 12 may be adjusted along the second pivot axis when the character display 12 is raised to the first open position.

Third Embodiment

FIG. 9 illustrates yet another example of a means for pivotable movement around a pivot axis, wherein the means for pivotable movement includes a hinge mechanism 48 located at one end of the pivot axis, within a hinge portion 60. The hinge mechanism 48 comprises a non-moving or stationary abutment 50 having a short shaft 51 having an open end extending therefrom, an end piece 54 located opposite and parallel to the non-moving abutment 50, a pair of friction plates 33, a pair of friction discs 34, a plurality of friction pads 35, a cam 52, a cam follower 53 and a spring 36.

When the hinge mechanism 48 is put together, the key sections of each of the friction plates 33 extend into an open section 55 of the hinge portion 60. This effectively eliminates movement of the friction plates 33 relative to the hinge portion 60, while allowing the friction pads 35 to rotate freely. The hinge portion 60 is fabricated integrally with the character display 12, so it will rotate as the character display 12 is moved from a closed to an open position, or vice versa. Thus, the hinge portion 60 rotates as the character display 12 is moved and the friction plates 33 rotate accordingly with the hinge portion 60.

The non-moving abutment 50 is fabricated integrally with the base portion of the apparatus 10 and therefore will not move as the character display 12 is moved. As the short shaft 51 is affixed to the non-moving abutment 50, the short shaft 51 also will be non-moving as the character display 12 is moved.

Thus in the third embodiment, the friction discs 34 remain completely stationary, the friction plates 33 rotate as the character display 12 is moved, and the friction pads 35 rotate freely. This combination creates friction between the pieces in exactly the same relation as the friction between the pieces in the first embodiment.

In this third embodiment, the cam 52 is integral with the hinge portion 60 and will therefore move as the hinge portion 60 is moved. Furthermore, the cam follower 53 also functions as a friction disc and has a central opening, the shape of which conforms to the cross sectional shape of the short shaft 51, such that the cam follower 53 may be inserted onto the short shaft 51. Therefore, when the character display 12 is moved, the cam 52 moves, but the cam follower 53 does not. This is contrasts with the second embodiment, where the cam 41 is stationary while the cam follower 42 moves as the character display 12 is rotated to a viewing position from the closed position, and vice versa.

FIGS. 10A-10C illustrate the operation of the third embodiment as the character display 12 is moved to the viewing position. The inserts provide detail as to the movement of the pieces of the hinge mechanism 48 in each FIGURE. The motion of the pieces, is exaggerated for purposes of demonstration, especially with regard to the cam 52. FIG. 10A shows the character display 12 in the vertical position, where the cam 52 is not engaged. FIG. 10B and 10C show that, as the character display 12 is moved toward the viewing position, the cam follower 53 engages the cam 52 and provides additional friction in the form of torsional force. The additional friction is the result of the cam 52 driving the adjacent friction disc 34 in an axial direction which slightly compresses the friction plates 33, friction discs 34 and the friction pads 35. In FIG. 10C, the character display 12 is fully open and the cam follower 53 has reached the far edge of the cam 52. The addition of torque as the character display 12 is moved to the viewing position adds stability so that the character display 12 does not shift out of position.

The foregoing descriptions have been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

What is claimed is:

1. A brake assembly for a hinge mechanism, the hinge mechanism supports a character display on an electronic typewriter or portable computer for pivotable movement between a closed position and a viewing position, the brake assembly comprising:
   a) a shaft;
   b) a plurality of disc shaped brake members mounted on the shaft;
   c) a first means compressing the brake members for providing a first braking force for braking the pivotable movement of the character display wherein the first means compressing the brake members is provided along the shaft and adjacent to said brake members;
   d) means for providing a pair of abutments along the shaft such that the brake members and the first compressing means are positioned between the abutments and the first compression means is in a first slightly compressed state; and
   e) a second means compressing the brake members for providing a second braking force greater than the first braking force for braking the pivotable movement of the character display at the viewing position by moving the pair of abutments closer together along the shaft in response to movement of the character display to the viewing position such that the first compressing means is in a second greater compressed state.

2. The brake assembly of claim 1 wherein the first means is a spring.

3. The brake assembly of claim 2 wherein the spring is a coil spring mounted on the shaft for compressing the disc shaped members axially along the shaft.

4. The brake assembly of claim 1 wherein the second means includes a cam and a cam follower, the cam follower being driven by the cam for compressing the brake members in response to movement of the character display to the viewing position.

5. The brake assembly of claim 4 further comprising means for holding the cam follower stationary and wherein the cam is connected to the character display causing the character display to drive the cam relative to the cam follower in response to the pivotable movement of the character display for compressing the brake members.

6. The brake assembly of claim 1 further comprising holding means and rotating means, and wherein the plurality of disc shaped brake members includes stationary members and rotating members, the stationary members engage the holding means to prevent rotation of the stationary members, and the rotating members engage the rotating means for rotating the rotating members relative to the stationary members to provide a braking force for braking the pivotable movement of the character display.

7. The brake assembly of claim 6 wherein the holding means is a cover member.

8. The brake assembly of claim 6 wherein the rotating means is the shaft supporting the brake members.

9. The brake assembly of claim 8 wherein the shaft has an irregular cross section and the rotating members have central openings conforming to the irregular section of the shaft for rotation by the shaft.

10. The brake assembly of claim 6 wherein the holding means is the shaft supporting the brake members.

11. The brake assembly of claim 10 wherein the shaft has an irregular cross section and the stationary members have central openings conforming to the irregular section of the shaft to prevent rotation of the stationary members.

12. The brake assembly of claim 6 wherein the rotating means is a hinge portion of the hinge mechanism.

13. The brake assembly of claim 6 wherein the plurality of disc shaped brake members includes friction pads located between the stationary members and the rotating members to provide friction for resisting rotation of the rotating members relative to the stationary members.

14. The brake assembly of claim 13 wherein the friction pads are composed of rubber.

15. A hinge suitable for use on a pivotable character display for an electronic typewriter, personal word processor or portable computer, comprising:
   a) a pair of abutments parallel to each other;
   b) a shaft having two ends, such that said shaft is between said pair of abutments and connected to at least one of said abutments, wherein said shaft is in alignment with a pivot axis of said pivotable character display;
   c) at least one friction plate, located along said shaft, wherein said friction plate includes a key section extending outwardly therefrom which is fixedly held to an object intended to pivot about said shaft and a centrally located aperture such that said friction plate rotates freely about said shaft;
   d) at least one friction disc, located along said shaft, wherein said friction disc includes a centrally located aperture which conforms to a cross section of said shaft such that said friction disc is fixedly held to said shaft;
   e) at least one friction pad, located along said shaft and between each of said friction plates and said friction discs, wherein said friction pad includes a centrally located aperture such that said friction pad rotates freely about said shaft;

f) a spring located at one end of said hinge mechanism such that said spring applies a first compression force to said friction plate, said friction disc and said friction pad along said shaft, wherein a combination of friction between said friction plate and said friction pad and friction between said friction disc and said friction pad provide a braking force for braking the pivotable movement of the character display; and g) a cam and cam follower located at one end of said hinge mechanism, such that a second compression force is applied to said friction plate, said friction disc and said friction pad along said shaft, as said character display is brought into a predetermined position, by moving said pair of abutments closer together such that said braking force is increased in response to movement of said character display into said predetermined position.

16. A hinge suitable for use on a pivotable character display for an electronic typewriter, personal word processor portable computer, consisting of:

a) a pair of abutments parallel to each other;

b) a shaft having two ends, such that said shaft is between said pair of abutments and connected to at least one of said abutments, wherein said shaft is in alignment with a pivot axis of said pivotable character display;

c) a plurality of friction plates, located along said shaft, wherein said friction plates include a key section extending outwardly therefrom which is fixedly held to an object intended to pivot about said shaft and a centrally located aperture such that said friction plates rotate freely about said shaft;

d) a plurality of friction discs, located along said shaft, wherein said friction discs include a centrally located aperture which conforms to a cross section of said shaft such that said friction discs are fixedly held to said shaft;

c) a plurality of friction pads, located along said shaft and between each of said friction plates and said friction discs, wherein said friction pads include a centrally located aperture such that said friction pads rotate freely about said shaft;

f) a spring located at one end of said hinge mechanism such that said spring applies a first compression force to said friction plates, said friction discs and said friction pads along said shaft, wherein a combination of friction between said friction plates and said friction pads and friction between said friction discs and said friction pads provide a braking force for braking the pivotable movement of the character display; and g) a cam and cam follower located at one end of said hinge mechanism, such that a second compression force is applied to said friction plates, said friction discs and said friction pads along said shaft by said spring, as said character display is brought into a predetermined position, wherein said pair of abutments are moved closer together and said braking force is increased in response to movement of said character display into said predetermined position.

17. The brake assembly of claim 1 wherein said braking mechanisms only applies the first braking force as said character display pivots through positions not intended for viewing and the second braking force is applied as said character display is brought into positions intended for viewing.

18. The brake assembly of claim 15 wherein said braking mechanism only applies the firs braking force as said character display pivots through positions not intended for viewing and the second braking force is applied as said character display is brought into positions intended for viewing.

19. The brake assembly of claim 16 wherein said braking mechanism only applies the first braking force as said character display pivots through positions not intended for viewing and the second braking force is applied as said character display is brought into positions intended for viewing.

* * * * *